United States Patent Office 3,537,088
Patented Oct. 27, 1970

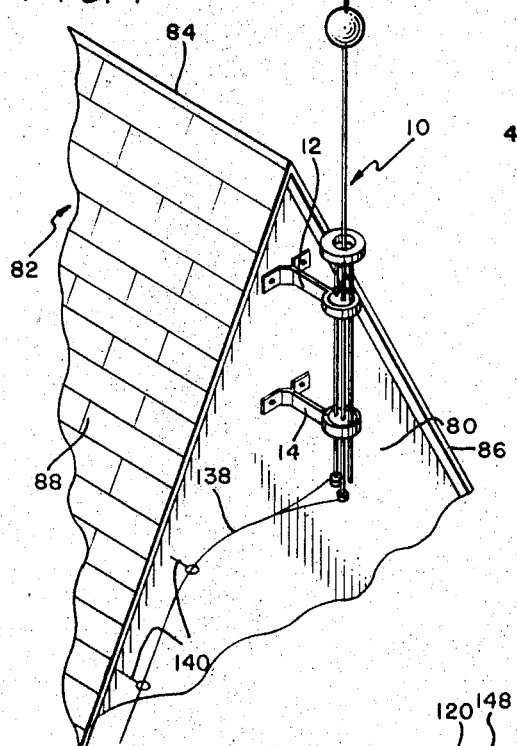

3,537,088
HIGH WIND SENSING AND WARNING SYSTEM
Vernon O. Wells, Wichita, Kans.
(1866 S. Kentwood, Springfield, Mo. 65804)
Filed July 22, 1966, Ser. No. 567,111
Int. Cl. G08b *21/00*
U.S. Cl. 340—241                                  9 Claims

ABSTRACT OF THE DISCLOSURE

A wind warning system including a wind actuated electric switch structure adapted to be mounted for exposure to wind from any direction, the switch structure comprises an upstanding resilient mast of electrically conductive material carrying a wind loading device at its upper end, an annular electrically conductive member coaxially disposed about an intermediate portion of the mast, such member being carried at the upper end of an electrically conductive rod. The lower end portions of the mast are electrically insulated from each other and are held against relative movement. Wind having a predetermined minimum velocity causes the mast to contact the annular member to close an electric circuit (coupled by leads to lower portions of the mast and rod) that includes in series an electric power source and an electrically actuated alarm.

---

The present invention relates to new and useful improvements in wind indicating systems, and more particularly pertains to a wind warning system which will produce an alarm signal when wind velocity equals or exceeds a predetermined value, such system including a normally open switch having a movable contact that moves toward a fixed contact of the switch by an amount that is a function of wind velocity.

Many proposals have heretofore been made for sensing and giving an indication of wind velocity and/or direction; however, such proposals usually involve complex organizations best suited for use by practicing meteorologists and under such conditions of use that systematic inspection, maintenance and repair of the systems must be made. Exemplary of such prior art proposals are those disclosed in the following listed U.S. patents, the disclosures of which are incorporated herein by reference: 2,812,512; 2,913,546; 2,098,099; 2,780,937; 2,665,583; and 2,125,365.

Many persons, unlike meteorologists, are primarily concerned with becoming apprised whenever wind velocity exceeds a predetermined amount, and are relatively little concerned with the direction of the wind at any time or what the wind velocity may be when less than the predetermined amount. Inasmuch as most really destructive storms, whether local in character, as are tornadoes, or widespread in character, as are hurricanes, are usually preceded in time before becoming destructive by winds of considerably higher than usual velocity, but yet less than being of destructive magnitude. Such circumstances would enable a person to be forewarned of the likelihood or strong possibility of a destructive storm if he is immediately apprised whenever the wind reaches a value predetermined to be such as to be infrequent in occurrence, but of such a magnitude as to possibly be associated with an approaching storm.

Being forewarned of a potentially destructive storm situation by reason of being informed of wind reaching the above defined predetermined value, persons may by virtue of the time differential between the occurrence of such predetermined wind velocity and the destructive onslaught of the storm have at least sufficient time to scramble to a shelter for personal safety and usually to have sufficient time to take measures to protect property subject to storm damage; hence, the need for an effective and reliable system to indicate wind velocity having reached the predetermined magnitude. Steps that may be taken on short notice to protect property can be such as the provision of additional mooring for pleasure boats, placing automobiles in garages, the closing of house and automobile windows, and the lowering of antenna structures. Such advance warning is not only of value to individuals for the reason of their personal safety and the protection of their own property, but also such warning has value to business and engineering operations with respect to such widely varying steps of protection of property as the lowering of flags on office buildings to prevent undue wear, and the shutting down of offshore oil producing installations, etc.

In view of the foregoing, the primary object of the subject invention is to provide apparatus of simple, durable and inexpensive character that is substantially maintenance free and that will reliably produce an alarm signal whenever wind velocity exceeds a predetermined amount, whereby an advance indication of storm conditions or the present or threatened existence of harmful wind velocities may be had.

Still another important purpose of the subject invention is to provide a warning system of the character set forth above such that the predetermined wind velocity sufficient to actuate the signal can be conveniently preadjusted to suit the user's needs.

Still another purpose of the invention is to provide a system of the character described above which is substantially foolproof, and can be readily adapted for installation in widely differing environments by unskilled persons.

An important aspect of the invention involves, for use in a wind warning system, an omnidirectional wind actuated switch comprising a resilient mast having first and second end portions, means for rigidly mounting the mast at its first end portion whereby the second end portion can be exposed to and thereby constitute a wind load and be caused by wind to flex laterally at its second end portion as well as at a position along the length of the mast spaced toward the second end portion from the first end portion, said mast having an annular, external and electrically conductive surface at said position along its length, an annular member disposed in spaced concentric relation about said position along the mast when the mast is in repose, said annular member having an annular and electrically conductive internal surface, and means for mounting the annular member in substantially fixed relation to the first end portion of the mast, whereby a predetermined degree of flexure of the mast causes engagement of the electrical conductive surfaces.

A more restrictive version of the aspect of the invention set forth in the preceding paragraph involves the inclusion of a plurality of elongated elements parallel to and angularly as well as radially spaced about the mast, each of said elements having a first end fixed to the annular member, an electrically insulative body of flexible material, said mounting means for the mast including the body having a mast opening therethrough slidably receiving the first end portion of the mast therethrough, said body including a slot opening laterally from the mast opening, said means for mounting the annular member including the body having a plurality of openings therethrough which slidably receive the elongated elements therethrough, said body including a plurality of slots opening laterally from the plurality of openings, and a mounting bracket including a clamp means embracing and releasably gripping the body for constricting all the openings through the body and adjustably fixing the positions of the elongated elements and the mast with respect to the body, and wind loading means carried by the second end portion of the mast, This more restricted aspect of the invention may additionally involve the mast, the annular member and at least one of the elongated elements being metallic, together with means at the first end portion of the mast and the second end portion of said one elongated element being adapted for connection as terminals to electrical conductors.

A more comprehensive aspect of the invention involves a wind warning system comprising a resilient mast having first and second end portions, means for rigidly mounting the mast at its first end portion whereby the second end portion can be exposed to and thereby constitute a wind load and be caused by wind to flex laterally at its second end portion as well as at a position along the length of the mast spaced toward the second end portion from the first end portion, said mast having an annular, external and electrically conductive surface at said position along its length, an annular member disposed in spaced concentric relation about said position along the mast when the mast is in repose, said annular member having an annular and electrically conductive internal surface, means for mounting the annular member in substantially fixed relation to the first end portion of the mast, and normally open electric circuit means including in series a source of electrical energy, the electrically conductive surfaces and an electrically actuated signal device, whereby a predetermined degree of flexure of the mast causes engagement of the electrical conductive surfaces and thereby closes the electric circuit to actuate the signal device.

A more restrictive version of the aspect of the invention set forth in the preceding paragraph involves including a plurality of elongated elements parallel to and angularly as well as radially spaced about the mast, each of said elements having a first end fixed to the annular member, an electrically insulative body of flexible material, said mounting means for the mast including the body having a mast opening therethrough slidably receiving the first end portion of the mast therethrough, said body including a slot opening laterally from the mast opening, said means for mounting the annular member including the body having a plurality of openings therethrough which slidably receive the elongated elements therethrough, said body including a plurality of slots opening laterally from the plurality of openings, and a mounting bracket including a clamp means embracing and releasably gripping the body for constricting all the openings through the body and adjustably fixing the positions of the elongated elements and the mast with respect to the body, and wind loading means carried by the second end portion of the mast.

An important feature of the present invention resides in the provision of means whereby the extent of the mast above the fixed mounting can be adjusted and/or the vertical spacing of the stationary contact above the fixed mounting can be adjusted.

Another important feature of the invention resides in the provision of means facilitating the mounting of the wind sensing structure upon the walls of buildings and houses or upon chimneys in a manner quite analogous to those conventionally used for mounting the masts of conventional television antennas, and indeed such means may include virtually any of the conventional mounting brackets employed for mounting the masts of television antennas.

A feature of the invention of importance in connection with the means set forth in the preceding paragraph resides in the provision of mounting blocks or bodies of electrically insulative material in which there is provided a keyhole-like opening for releasably clamping vertically adjustable portions of the sensing system that are slidable therethrough, such blocks or bodies being of such character as to be in turn clamped by the mast engaging portion of conventional TV antenna mast mounting brackets.

These and other purposes, aspects and features of the invention will become quite clear during the ensuing description of a preferred embodiment of the invention, such description to be taken in conjunction with the accompanying drawings, wherein:

FIG. 1 illustrates on a reduced scale a fragmentary portion of a house with the wind sensing apparatus being shown mounted on an end wall of the house adjacent the ridge of the roof sections;

FIG. 2 is an enlarged side elevational view of the wind sensing structure, such view having an intermediate portion of the length of the mast removed, portions of the mounting brackets also being removed, and with the ball and means for securing the ball to the mast being shown in section;

FIG. 3 is a still further enlarged top plan view of one of the mounting brackets together with one of the electrically insulative bodies clamped by such bracket;

FIG. 4 is, on a still greater scale, a top plan view of one of the electrically insulative bodies, and illustrating particularly the keyhole-like openings enabling vertical adjustment through and clamping of wind sensing components therethrough;

FIG. 5 is a side elevational view of the structure shown in FIG. 4;

FIG. 6 is a central vertical sectional view of electrically conductive portions of the wind sensing structure, with portions of the mast and annular member suporting means being broken away;

FIG. 7 is an enlarged horizontal sectional view taken upon the plane of the section line 7—7 in FIG. 2; and, FIG. 8 is a schematic diagram illustrating the electrical coupling of the wind sensing structure shown in the preceding figures to an audio and/or visual signal or alarm device, together with the provision of means for energizing the signal or alarm and means for bypassing lightning strokes or excessive static charges to ground.

Referring now to the drawings, wherein like numerals designate like parts throughout the various views, the numeral 10 designates the wind sensing structure or normally open electric switch means that is responsive to wind in excess of a predetermined value to close and thereby complete, as will be seen presently, an electric circuit to an electric signaling device or alarm.

A combined means is provided for securing the apparatus 10 at a position of use and also for retaining the apparatus 10 in adjusted and assembled relation. Such means comprises a pair of mounting assemblies 12 and 14, such mounting assemblies 12 and 14 being identical to each other. Since the mounting assemblies 12 and 14 are identical, a detailed description of one of such mounting assemblies will suffice for both, and accordingly, attention is directed to FIGS. 3, 4 and 5 wherein the mounting assembly 12 is shown in detail. The assembly 12 comprises a conventional mounting bracket 16 such as is used for securing a TV antenna mast to a vertical wall, with the mast being spaced outwardly from such wall. Such conventional bracket 16 is comprised of a pair of steel sections or straps 18 and 20 which are fixedly secured to each other as by spot welding 22 and 24. The steel straps 18 and 20 are, adjacent spot welding 22, outwardly turned to constitute apertured mounting feet 26 and 28. It will be understood that the bracket 16 can be readily mounted to a vertical wall so as to lie in a horizontal plane by means of lag screws or masonry anchor bolts (not shown) extending through the mounting openings or apertures 30 in the mounting feet 26 and 28.

As is conventional, the bracket 16 has the straps 18 and 20 thereof outwardly divergent at a position on the side of the spot welding 24 remote from the mounting feet 26 and 28, and such divergent portions 32 and 34 of the bracket straps 18 and 20 are arcuate so as to constitute or define a circular space 36 therebetween, and the outer extremities of the straps 18 and 20 are bent to form a pair of spaced ears or lugs 38 and 40, such lugs 38 and 40 having a pair of aligned openings through which a threaded bolt 42 extends. A nut 44 is threaded upon the bolt 42, whereby the spaced lugs or ears 38 and 40 can be forcibly urged toward each other. A conventional TV mast mounting bracket such as that indicated at 16 is conventionally dimensioned so that the nut and bolt 44 and 42 can be tightened so as to tightly clamp hollow, vertically extending steel tubing (not shown) in the opening 36, such tubing of the TV mast customarily having an outside diameter of about 1⅛ inches. The only essential characteristics of the bracket 16 are that the same is such as to adjustably clamp upon a generally cylindrical body as described and that the same can be attached to a supporting surface or structure. It will be noted that the conventional bracket 16 includes at the juncture of the mounting feet 26 and 28 a V-shaped notch constituting a 90° dihedral angle 46, whereby the bracket 16 can be seated in the customary manner against the corner of a chimney (not shown) and retained in such position seated against the chimney by means of a securing strap (also not shown) that embraces the chimney and has its opposite ends secured in a taut condition to the mounting feet 26 and 28.

Generally speaking, it will be appreciated that any conventional TV mast mounting bracket can be employed in lieu of the illustrated and described bracket 16, it only being necessary that such bracket include means for clamping a conventional TV mast.

The mounting assembly 12 also includes a generally cylindrical block or body 50 of electrically insulative material. The body 50 is preferably any suitable synthetic resin or plastic having at least a modest degree of flexibility for a purpose presently to be described. The body 50 can conveniently be nylon or neoprene. The body 50, as stated previously, is of generally circular cylindrical configuration, and the same has an outside diameter approximately that of a conventional TV antenna mast, namely, about 1⅛ inches. Additionally, the body 50 terminates at its opposite axial ends in parallel planes 52 and 54 that are normal to the axis of the body 50, and the axial length of the body 50 is preferably selected to be approximately equal to the vertical dimension of the bracket 16, such dimension ordinarily being approximately one inch.

For reasons subsequently to be explained, the body 50 is provided with a central axial opening 56 therethrough, and a slot 58 extends radially from the opening 56 to the exterior of the body 50, it being noted that the slot 58 extends the full axial extent of the body 50 and that the slot 58 has a width less than the diameter of the opening 56, the arrangement being such that when the body 50 is circumferentially and radially clamped so as to flex and cause closure or narrowing of the slot 58, the size of the opening 56 is restricted so as to clamp upon a cylindrical object which would otherwise be slidable through the opening 56 when the body 50 is in the position of repose shown thereof in FIG. 4. Additionally, the body 50 is provided with a pair of axially extending openings 60 and 62 therethrough that are disposed on opposite sides of and in parallelism with the opening 56. The openings 60 and 62 are respectively provided wiht slots 64 and 66 that extend through the exterior of the body 50, the arrangement being such that circumferential and/or radial compression of the body 50 results in flexing the body to cause closing movement of the slots 64 and 66 and resulting restriction of the transverse dimensions of the openings 60 and 62, as previously described in connection with the slot 58 and the opening 56.

The body 50 is disposed within the opening 36 in the bracket 16 when the bolt 42 and nut 44 are loosened, it being understood that subsequent tightening of the nut 44 on the bolt 42 serves to progressively restrict the transverse dimensions of the openings 56, 60 and 62. As will be appreciated by those skilled in the art, the action is quite similar to that obtained in the use of conventional standoffs for TV transmission line (not shown) wherein a standoff is comprised of a rod having a partially formed eye at one end with an insulator member of flexible plastic disposed in the eye. Such insulator has a keyhole-like opening therein into which a transmission line can be positioned, and thereafter firmly retained and gripped by the insulator member on bending the eye forming structure to compressively grip the insulator member. Such conventional standoff mounts for television transmission line customarily include means for preventing accidental dislodgement of the insulator body from the eye prior to the latter being tightened, such provision ordinarily being in the form of a peripheral groove in the external surface of the insulator body with the material forming the eye being disposed in such groove. Optionally, and for the same general purpose, the body 50 can, as shown, be provided with integral radially extending lips or flanges 70 and 72 at its upper and lower ends for preventing inadvertent dislodgment of the body 50 from within the opening 36 when the nut 44 is loosened on the bolt 42, it being understood that the lips 70 and 72 respectively are disposed immediately above and below the straps 18 and 20 about the opening 36. When the body 50 includes the optional lips 70 and 72, it will be obvious that the nut 44 can be removed and the body 50 forced between the straps 18 and 20 while the straps are forced apart to the extent necessary. In the preferred construction, the straps 18 and 20 possess a moderate degree of resiliency, and about the opening 36 have a position of respose such as to be engaged between the lips 70 and 72 while not subjecting the body 50 to such radial and peripheral forces as will appreciably close the slots 58, 64 and 66.

It will be manifest to those familiar with the art that an alternative arrangement can be provided in lieu of the optionally provided lips 70 and 72 to accomplish the function of the latter, namely, the adjacent sides of the straps 18 and 20 can be provided about the opening 36 with inturned flanges at their upper and lower edges so as to retain the body 50 therebetween.

In the mounting of the assemblies 12 and 14, they are secured to any suitable support such as a chimney or, for example, a vertical end wall 80 of a house 82 (see FIG. 1) in such a manner that the mounting assemblies 12 and 14 are vertically spaced with the body openings 56 being in vertical alignment. A vertical spacing of about one foot is quite satisfactory for the mounting assemblies 12 and 14, though there is nothing critical as to the amount of such spacings, it only being necessary that the vertical spacing be at least sufficiently great to resist adequately bending loads that may be applied by wind to remaining portions of the apparatus 10 yet to be described. It is preferred that the mounting assemblies 12 and 14 are attached to the wall 80 adjacent the upper extremity of the wall 80, that is, adjacent the roof ridge 84 so that remaining portions of the apparatus 10 yet to be described can project above the roof ridge 84, it being noted that the longitudinal extent of the mounting assemblies 12 and 14 is such that the bodies 50 are disposed laterally outwardly from any overhang of the roof sections 86 and 88.

Proceeding now to describe the remaining portions of the apparatus 10, an electrically conductive and resilient rod or mast 90 of circular cylindrical transverse section and preferably of stainless steel is disposed to extend through the aligned openings 56 of the insulating bodies 50, such resilient rod or mast 90 having a diameter such as to be slidable through the openings 56 when the bodies 50 are in repose, that is, when the bodies 50 are not clamped by the brackets 16 so as to narrow the slots 58 and restrict the openings 56. In an actual working model, a suitable fit is obtained for the mast 90 when the mast has an outside diameter of $5/32$ inch, and the openings 56 have a diameter of $5/32$ inch, the body 50 being of nylon.

The mast 90 extends from below the mounting assembly 14 to a position substantially above the mounting assembly 12, and at a position spaced from the upper end of the mast 90, the latter is provided with an enlargement 92 (see FIG. 2), which enlargement 92 can be formed by simply crimping or deforming the same slightly from a circular configuration, the purpose of such enlargement 92 being to limit downward movement of an upwardly concaved metallic washer 94 that is otherwise slidable on the upper end portion of the mast 90. The portion of the mast 90 above the washer 94 is extended through diametrically opposed openings 96 and 98 in a hollow plastic ball 100, the latter being disposed so as to rest upon the washer 94. A downwardly concaved metallic washer 102 is positioned on the mast 90 above the ball 100, and the upper end portion 104 of the mast 90 is threaded as shown, and a nut 106 is threaded on the threaded portion 104 to bear against the washer 102 to retain the plastic ball 100 in position on the mast 90. It is to be expressly noted that the threaded portion 104 has an extent such as to extend from a position within the hollow ball or sphere 100 to a position substantially above the nut 106. The purpose of such an extent of the threaded portion 104 is to enable replacement of the hollow plastic sphere or ball 100 by hollow plastic spheres or balls of greater or less diameter than the sphere or ball 100. As will be appreciated subsequently, the hollow plastic sphere or ball 100 constitutes an effective enlargement of the mast 90 adjacent its upper end and is for the purpose of constituting a wind load such that a horizontal wind blowing against the ball 100 will tend to cause flexure of the resilient mast or rod 90. It will be evident that substitution of a smaller ball 100 will reduce the wind loading effect and consequent flexure of the mast 90 for a given wind velocity, whereas substitution of a larger ball 100 will constitute a greater wind load and result in greater flexure of the mast 90 for a given wind load. Accordingly, the provision of a substantial threaded portion 104 enables the user by the simple expedient of substitution of different ball sizes to adjust the extent of flexure of the mast 90 for any given wind velocity. It is preferred that the ball or sphere 100 be hollow so as to minimize the weight and amount of materials employed, it being understood that the wall thickness of the hollow sphere or ball 100 is sufficient to prevent collapsing or taking the form of an oblate spheroid. Clearly, when the weight and/or the cost of materials employed are not significant considerations, the sphere or ball can be solid except for the provision of an opening therethrough to accommodate slidable positioning of the same on the mast 90. When the resilient rod or mast 90 is of stainless steel, has a diameter of $5/32$ inch, and is adjusted so that the enlargement 92 thereon is disposed 20 inches above the top of the upper mounting bracket 12, it has been found that the ball or sphere 100 can conveniently be of about 4 inches diameter as a typical value, though balls of either greater or lesser diameter can be employed as previously described.

The lower end portion 110 of the rod or mast 90 is disposed below the mounting assembly 14 and is externally threaded as shown. An electrical conductor 112 is provided having an annular terminal 114 disposed about the threaded portion 110, and is retained in electrical engagement with the electrically conductive mast 90 by means of a pair of nuts 118 clamping the same therebetween.

An annular, electrically conductive member 120 preferably made of metal such as stainless steel is coaxially positioned about the mast 90 at a position spaced above the upper mounting assembly 12, and the annular member 120 is provided with a pair of diametrically opposed depending parallel rods 122 and 124 of electrically conductive material, preferably stainless steel, such rods being parallel to the mast 90 and slidably extending through the openings 60 and 62 of the bodies 50 when such bodies 50 are in repose. In the working model previously referred to, the rods 122 and 124 were welded as indicated at 126 to the annular member 120 to establish electrical connection therebetween, and such rods 122 and 124 were of $1/8$ inch diameter. The openings 60 and 62 through which the rods 122 and 124 extend have diameters of $1/8$ inch when the bodies 50 are in repose, whereby the vertical position of the annular member 120 with respect to the upper mounting assembly 12 can be adjusted.

It will be understood that after the vertical extension of the mast 90 and the vertical position of the annular member 120 have been adjusted, the nuts 44 of the brackets 16 are tightened so as to cause the bodies 50 to grip the mast 90 in the openings 56 and the rods 122 and 124 in the openings 60 and 62 so as to retain the entire apparatus 10 in assembled relationship.

The lower end of one (122) of the rods has an externally threaded lower portion disposed below the lower mounting assembly as indicated at 130, and an electrical conductor 132 having an annular mounting terminal is disposed thereabout and clamped between nuts 134 threaded on the rod 122.

Except adjacent to the lower ends of the mast 90 and the lower end of the rod 122, the electrical conductors 112 and 132 are provided with electrical insulation as indicated at 136, and such insulated electrical conductors 112 and 132 extend from the apparatus 10 as a single insulated twin conductor cable 138.

As suggested in FIG. 1, the conductor cable 138 extends from the apparatus 10, and may be mounted in such a manner as to be supported in a position relatively safe from damage and from inadvertent electrical contact therewith by means of standoff insulators such as indicated at 140.

As thus far described, it will be evident that whereas the mast 90 is secured against vertical as well as lateral movement throughout its extent downwardly from the top of the upper mounting assembly 12, the mast 90 is free to flex from its vertical position of repose in any direction as may be caused by the force of wind against the upper part of the mast 90 itself, and particularly as the result of any lateral force applied to the mast 90 by the force of wind against the ball or sphere 100. With a steady wind velocity, the degree or extent of lateral flexure at any point along the extent of the mast above the upper mounting assembly 12 is a function of the height of such position above the top of the upper mounting assembly 12, it being evident that such extent of flexure laterally increases progressively upwardly from the top of the upper mounting assembly 12.

When the wind velocity is sufficiently great, the mast 90 will be caused to flex to such an extent that the external surface thereof will mechanically and electrically make engagement with some position about the inner peripheral surface 146 of the central opening 148 through the annular member 120, and such mechanical and electrical engagement will by virtue of the electrical conductivity of the mast 90 and the rod 122 and their respective electrical connections to the conductors 112 and 132 result in establishing electrical continuity between such conductors 112 and 132, such action being the same as the closing of a normally open switch between the conductors.

The wind velocity necessary to effect such switch closure is predetermined by a combination of factors, namely, the extent to which the mast 90 is adjusted to extend above the upper mounting assembly 12, the diameter of the ball or sphere 100, and the extent to which the annular member 120 is adjusted in its vertical spacing above the upper mounting assembly 12. Such factors are of course in addition to relatively fixed parameters such as the spring strength and diameter of the mast 90, the diameter of the opening 148, etc. It will be noted that any one or combination of such factors can be readily adjusted in the use of the apparatus 10. Obviously, other factors being held constant, upward extension of the mast 90 will result in a lesser wind velocity being required to close the switch. Other factors being equal, an increase in the diameter of the ball or sphere 100 will lessen the required wind velocity, and finally, an increase in the vertical spacing of the annular member 120 above the upper mounting assembly 12 will lessen the required wind velocity. Accordingly, adjustment of any one or combination of such variable factors can be effected so that switch closure (electrical engagement between the external surface of the mast 90 and the internal surface of the member 120) can be caused to occur at any desired wind velocity, whereby such wind velocity can be predetermined.

With the sphere 100 having a diameter of 4 inches and its center 22 inches above the mounting assembly 12, the mast 90 being stainless steel and $5/32$ inch diameter, and with the opening 148 in the annular member having a diameter of $21/32$ inch, tests have been made using the wind tunnel at Wichita State University which shows spacings of the annular member 120 above the assembly 12 in the amounts of $4\frac{3}{4}$ inches, $4\frac{1}{2}$ inches and 4 inches, respectively, resulted in switch closure at wind velocities of 56, 65 and 75 miles per hours; such results being precisely reproducible insofar as could be observed.

The value of such switch actuation will be best appreciated upon inspection of FIG. 8, wherein it will be seen that the electrical conductors 112 and 132 (which constitute the electric cable 138) are in electrical series with a signal or alarm device 150, and a source of electrical energy, such as, for example, an electric battery 152. The signal or alarm device 150 can be any audible or visual device operative upon electrical energization thereof to sound an alarm signal (bell, buzzer, horn, or the like) or flash (electric lamp) a visible signal. Indeed, as will be appreciated, the alarm device 150 can incorporate both sounding and flashing components. Accordingly, whenever the mast 90 is caused to engage with the annular member 120 as by action of the wind upon the ball 100, the circuit including the alarm device 150 and the source of electrical energy 152 is completed and the alarm 150 is energized and operated. It will be understood that the alarm 150 can be disposed at any location either in the immediate vicinity of the apparatus 10 (such as being outside the house 82) or at any desired position within the house 82, or alternatively by extension of the cable 138, the alarm device 150 can be disposed at a position quite remote from the apparatus 10.

For reasons of safety, such as when the electrical cable 138 is extended into and connected to an alarm 150 disposed in the house 82, an electrical grounding system is provided for removing excess static charges from the lines as well as for discharging lightning strokes. Such safety system includes an electrical ground (driven rod or water pipe) 160 connected via spark gaps 162 and 164 and lines 166 and 168 to the electrical conductors 132 and 112 respectively.

From the foregoing, it will be seen that there has been provided a simple and effective device for producing an electrically actuated alarm signal upon the occurrence of wind velocities equaling or exceeding a predetermined value.

Under wet freezing conditions, it is recognized that ice may tend to form within the opening 148; however, such formation of ice is impaired by motions of the mast 90 within such opening 148, and any ice formed can be expected on an increase of motion of the mast 90, such as resulting from increasing wind velocities, to be cracked and broken away so as to expose facing conductive surfaces of the annular member 120 and the mast 90. As to such self-cleaning function with respect to ice, it will be noted that the vertical thickness of the annular member 120 is small (say, on the order of $3/16''$ to $1/4''$, for example), and thereby coacts with the thin ($5/32''$, for example) mast 90 to concentrate stresses in ice upon which the mast 90 impinges so as to readily fracture the ice. It will also be noted that such minor degree of abrasion as may occur between the mast 90 and the annular member 120 is advantageous in assuring good metallic and therefore electrically conductive contact being established even if such contacts were made of materials not as resistant to corrosion as stainless steel; hence, electrically conductive materials other than stainless steel can be employed.

It should also be pointed out that even if the apparatus 10 were not such as to tend to be self-cleaning with respect to ice, such a shortcoming would be of minimal significance inasmuch as violent storms of the character herein contemplated are of most frequent if not solely of the occurrence when temperatures are well above the freezing mark.

Buffeting wind conditions and/or any oscillatory or resonant movement of the mast 90 may cause a somewhat regular or rhythmic flexure of the mast 90 to an extent intermittently exceeding the amount of flexure that would be caused by a corresponding steady wind velocity, and this often results in an intermittent closure of the switch at a wind velocity somewhat less than the predetermined wind velocity, that is, the wind velocity for which the apparatus 10 is adjusted to cause definite and continuous closure of the switch. Such intermittent closure of the switch is seen to be advantageous inasmuch as such intermittent closure of the switch and consequent intermittent operation of the alarm device 150 can be readily interpreted as a threshold warning by which is meant a preliminary indication that wind velocities are approaching the predetermined wind velocity or that unusually gusty conditions are prevailing which in itself may warrant the desirability of actuation of the alarm 150 before wind velocities have actually reached the predetermined wind velocity. When wind velocities are sustained for a period of time either equal to or in excess of the predetermined wind velocity, the closure of the switch will be substantially or entirely continuous with constant or at least substantially continuous actuation of the alarm 150.

While a plurality of supports (rods 122 and 124) are shown for the annular member 120, it will be evident that a single and relatively husky rod could be employed. A plurality of spaced parallel rods are preferred for the reasons that a lesser amount of material will serve to achieve the desired degree of rigidity or fixedness of position of the member 120, two $1/8$ inch rods (as shown) being sufficient in this regard, and that no rotation of the member 120 can occur about an axis of any of the rods.

While two mounting assemblies 12 and 14 have been shown, a single mounting assembly can be used provided it is of sufficient supporting strength and of sufficient strength to resist bending moments to which the apparatus is subjected during strong winds. Such considerations as these indicate that a considerable vertical height of supporting or mounting structure is desirable, and in view of such indication and in further view of the desire to conserve materials, two relatively small rather than one vertically elongated mounting assembly is used.

It is to be emphasized that enjoyment and practice of the present invention is not limited to the various dimensions that have hereinabove been given in connection with the working model that has been tested. Such dimensions have been given solely by way of example and in order to convenience those seeking to avail themselves of such specific design data. Similarly, it is not essential that the same materials be employed as those which have been mentioned, it being clear that many and various equivalents of such materials will come immediately to mind. For example, the bodies 50 can be made of silicone rubber if desired, and the use of such or other hydrophobic material (such as not to be wetted by water) might be highly preferred in some circumstances inasmuch as such water as might accumulate on the bodies 50 would assume the form of spaced droplets (by virtue of the surface tension of the water) and thus not afford an appreciable electrical leakage path paralleling the switch.

It is contemplated that a plurality of units can be placed at geographically spaced positions, with all the alarm devices being placed at a remote control or weather watch station, whereby an area of considerable size can be kept under surveillance. For example, sensing units could be spaced about an area lying southwest of Wichita, Kans. (which is situated in a region subject to tornado or severe thunderstorms particularly in late spring and early summer, and wherein such severe weather conditions generally move in a northeasterly direction), with all the alarm devices being disposed at a weather watch location in the city.

The present invention has been described in elaborate detail solely for the reason of conveying a full and complete understanding thereof, and any narrowness in scope of invention is not to be thereby implied.

I claim:

1. A wind warning system comprising a vertical and resilient mast having first and second end portions, a wind loading device carried by the uppermost second end portion and constituting a substantial radial enlargement thereof, means for rigidly mounting the mast at its first end portion whereby the second end portion and the wind loading device can be exposed to wind and thereby constitute a wind load such as to cause the mast to flex laterally at its second end portion as well as at a position along the length of the mast spaced intermediate the first and second end portions thereof, said mast having an annular, external and electrically conductive surface at said position along its length, an annular member disposed in spaced concentric relation about said position along the mast when the mast is in repose, said annular member having an annular and electrically conductive internal surface, means for mounting the annular member in substantially fixed relation to the first end portion of the mast, and electric circuit means coupled to the electrically conductive surface and including in series a source of electrical energy, and an electrically actuated signal device, whereby a predetermined degree of flexure of the mast causes engagement of the electrical conductive surfaces and thereby closes the electric circuit means with resultant actuation of the signal device.

2. The combination of claim 1, wherein the mast is metallic and wherein the means for mounting the mast includes a body of electrically insular material, said body being provided with a first opening therethrough, said body having a first slot therein opening laterally from the first opening to the exterior of the body, said body being of a flexible material, and said mounting means for the mast including a mounting bracket provided with a clamp means embracing and releasably gripping the body for constricting the first opening through the body, and said first end portion of the mast extending through the first opening in the body, said first end portion of the mast being substantially the same size as the opening when the clamp means is released, whereby the mast is longitudinally adjustable through the body and can be secured in adjusted relation to the body on gripping the body by the clamp means.

3. The combination of claim 2, wherein said annular member is metallic to define the second mentioned electrically conductive surface and constitutes a part of the circuit means, and said means for mounting the annular member including an elongated element spaced from the mast having a first end fixed to the annular member and a second end portion embracingly engaged by the body.

4. The combination of claim 1, wherein said means for mounting the mast includes a body of electrically insulating material, said first end portion of the mast being embracingly engaged by said body, and wherein said means for mounting the annular member comprises an elongated element having a first end fixed to the annular member and a depending second end portion embracingly engaged by said body.

5. For use in a wind warning system, an omnidirectional wind actuated switch comprising a vertical and resilient mast having first and second end portions, said second end portion being uppermost and having a wind loading device mounted thereon, means for rigidly mounting the mast at its first end portion whereby the second end portion of the mast and the device mounted thereon can be exposed to and thereby constitute a wind load for causing the mast to flex laterally at its second end portion as well as at a position along the length of the mast spaced intermediate the second end portion and the first end portion, said mast having an annular, external and electrically conductive surface at said position along its length, an annular member disposed in spaced concentric relation about said position along the mast when the mast is in repose, said annular member having an annular and electrically conductive internal surface, and means for mounting the annular member in substantially fixed relation to the first end portion of the mast, whereby a predetermined degree of flexure of the mast causes engagement of the electrical conductive surfaces.

6. The combination of claim 5, including a plurality of elongated elements parallel to and angularly as well as radialy spaced about the mast, each of said elements having a first end fixed to the annnular member, an electrically insulative body of flexible material, said mounting means for the mast including the body having a mast opening therethrough slidably receiving the first end portion of the mast therethrough, said body including a slot opening laterally from the mast opening, said means for mounting the annular member including the body having a plurality of openings therethrough which slidably receive the elongated elements therethrough, said body including a plurality of slots opening laterally from the plurality of openings, and a mounting bracket including a clamp means embracing and releasably gripping the body for constricting all the openings through the body and adjustably fixing the positions of the elongated elements and the mast with respect to the body, and wind loading means carried by the second end portion of the mast.

7. The combination of claim 6, wherein the mast, the annular member and at least one of the elongated elements being metallic, and means at the first end portion of the mast and the second end portion of said one elongated element being adapted for connection as terminals to electrical conductors.

8. The combination of claim 1, wherein the mast is metallic and wherein the means for mounting the first end portion of the mast includes a pair of vertically spaced bodies of electrically insulative material embracingly engaging the first end portion of the mast, and each of said bodies being provided with a horizontally extending mounting bracket, whereby the first end portion of the mast can be maintained vertical and stably supported upon a vertical wall spaced therefrom.

9. The combination of claim 8, wherein the annular member is metallic and wherein the means for mounting the annular member includes a metallic rod fixed to the latter and depending therefrom in spaced relation to the mast, and said rod being embracingly engaged by said bodies of electrically insulative material.

References Cited

UNITED STATES PATENTS

| | | | |
|---|---|---|---|
| 92,299 | 7/1869 | Fry | 174—154 |
| 947,094 | 1/1910 | Burton | 174—155 |
| 2,076,251 | 4/1937 | Rockola | 200—61.51 |
| 2,812,512 | 11/1957 | Budde | 340—241 |
| 2,913,546 | 11/1959 | Guinn | 340—241 XR |
| 3,053,949 | 9/1962 | Johnson. | |
| 3,054,096 | 9/1962 | Peritz | 340—261 XR |
| 3,359,550 | 12/1967 | Christensen | 200—61.51 XR |

FOREIGN PATENTS

| | | |
|---|---|---|
| 24,441 | 12/1914 | Great Britain. |
| 116,748 | 6/1918 | Great Britain. |

DONALD J. YUSKO, Primary Examiner

D. MYER, Assistant Examiner

U.S. Cl. X.R.

200—61.51